United States Patent [19]

Jones et al.

[11] 4,171,292

[45] * Oct. 16, 1979

[54] COMPOSITIONS FOR TREATING AQUEOUS MEDIUMS CONTAINING MAGNESIUM SULFITE TRIHYDRATE

[75] Inventors: Robert L. Jones, Hingham, Mass.; Lewis Volgenau, Ivyland; Philip S. Davis, Furlong, both of Pa.

[73] Assignee: Betz Laboratories, Inc., Trevose, Pa.

[ * ] Notice: The portion of the term of this patent subsequent to Jun. 6, 1995, has been disclaimed.

[21] Appl. No.: 914,696

[22] Filed: Jun. 12, 1978

Related U.S. Application Data

[63] Continuation of Ser. No. 711,915, Aug. 5, 1976, abandoned.

[51] Int. Cl.$^2$ .................... C02B 5/06; C08L 41/00
[52] U.S. Cl. .................... 260/29.6 WB; 106/308 S; 210/58; 252/411 S; 252/475; 260/29.6 SQ; 260/29.6 Z; 423/242; 526/910; 526/911; 525/3
[58] Field of Search .................... 260/29.6 Z, 29.6 SQ, 260/29.6 WB; 526/3, 910, 911; 423/242; 252/411 S, 475; 106/308 S; 210/58

[56] References Cited

U.S. PATENT DOCUMENTS

| | | | |
|---|---|---|---|
| 2,723,956 | 11/1955 | Johnson | 210/58 X |
| 3,646,099 | 2/1972 | Dannals | 260/465.5 R |
| 3,715,307 | 2/1973 | Johnson et al. | 210/58 |
| 3,793,277 | 2/1974 | Thompson | 260/29.6 AN |
| 3,801,699 | 4/1974 | Arnold | 423/244 |
| 3,898,037 | 8/1975 | Lange et al. | 210/58 X |
| 3,965,028 | 6/1976 | O'Brien et al. | 210/58 |
| 4,004,939 | 1/1977 | O'Brien et al. | 260/29.6 SQ |
| 4,093,580 | 6/1978 | Jones et al. | 260/29.6 SQ |
| 4,111,804 | 9/1978 | Miles et al. | 260/29.6 Z X |
| 4,126,549 | 11/1978 | Jones et al. | 210/58 |
| 4,136,152 | 1/1979 | Jones et al. | 210/58 X |

*Primary Examiner*—Howard E. Schain
*Attorney, Agent, or Firm*—Alexander D. Ricci; Steven H. Markowitz

[57] ABSTRACT

A composition is disclosed for use in dispersing magnesium sulfite tri-hydrate in an aqueous medium which composition comprises, in combination, an oligomer and a copolymer of a 1-olefin and an unsaturated anhydride.

14 Claims, 1 Drawing Figure

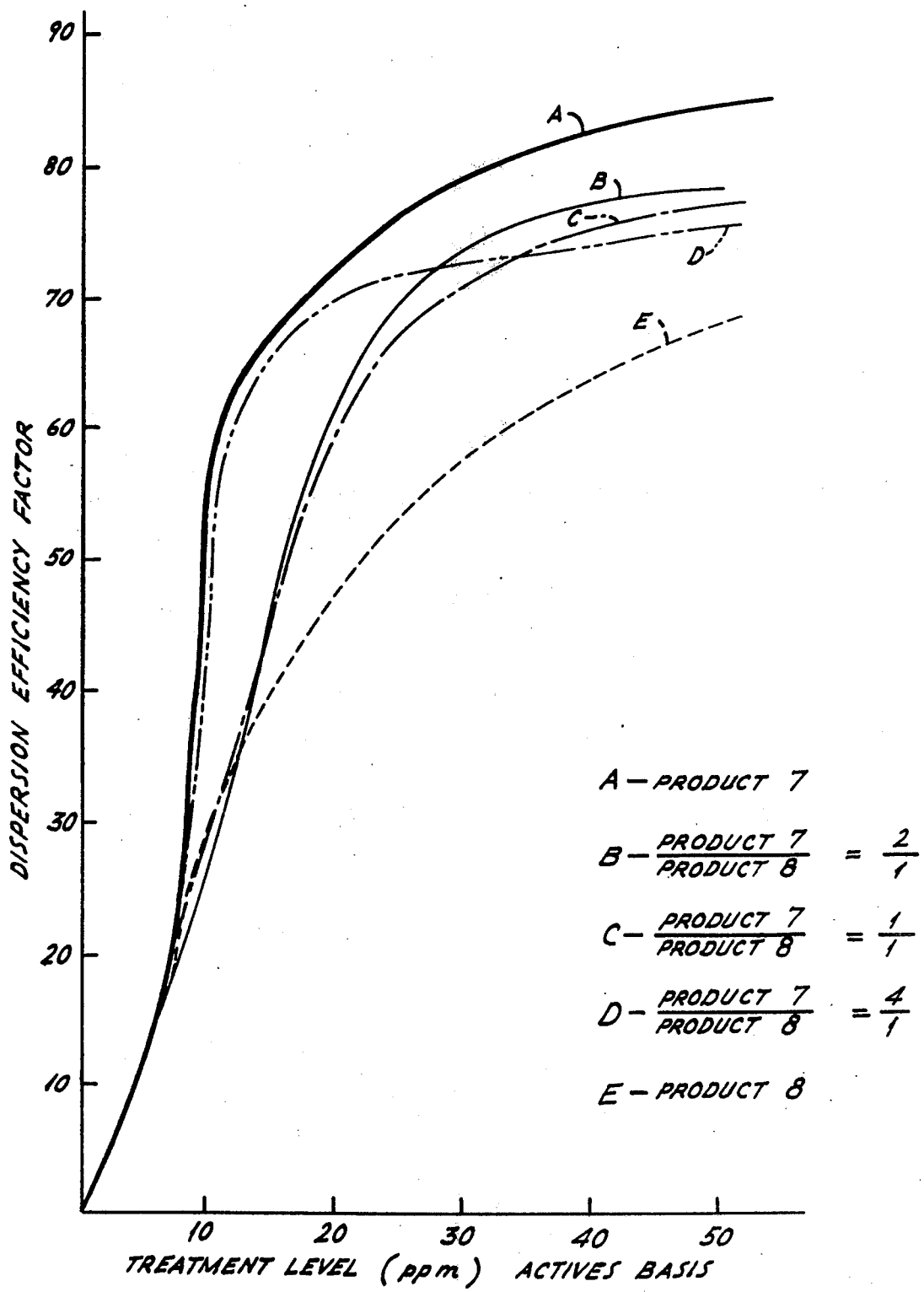

COMPOSITIONS FOR TREATING AQUEOUS MEDIUMS CONTAINING MAGNESIUM SULFITE TRIHYDRATE

This application is a continuation of Ser. No. 711,915 filed Aug. 5, 1976, now abandoned.

The present invention relates to a composition for treating an aqueous medium and more particularly to a composition for treating an aqueous medium containing magnesium sulfite tri-hydrate under precipitating conditions to prevent the formation of scale on surfaces in contact with the aqueous medium. Since magnesium sulfite tri-hydrate scale is considered to be a particularly bothersome problem in magnesium oxide based gas scrubbers for scrubbing sulfur-containing exhaust gases, the present invention will be described as it relates to such scrubbers.

The use of wet scrubber systems to remove gaseous and particulate material from waste stack gases is increasing. These wet scrubber systems are used in cleaning effluent from boiler stacks, incinerator stacks, lime kilns, foundries, blast furnaces, basic oxygen furnaces (BOF), open hearth units, coke plants, paper mill recovery boilers, pet food manufacturing facilities, electric furnaces, smelters, asphalt plants and many others.

The present invention is directed at those effluents which contain sulfurous gases. Indeed, $SO_2$ and $SO_3$ gases are found in the effluents from any furnace or boiler system where high sulfur fuels are used.

According to an important feature of these gas scrubber systems, a scrubber medium in liquid slurry form is contacted with stack gases to absorb the sulfur oxides therefrom. While many scrubber systems use lime or limestone as the scrubber medium, magnesium oxide has also been used. In most cases, the scrubber medium must be treated to control deposits formed on surfaces in contact with the medium.

It was observed by the present inventors that, although deposit control treatments were being added to the scrubber medium in a magnesium oxide based scrubber system, a particularly difficult deposit was still forming on surfaces in contact with the scrubber medium. This peculiar and difficult deposit was determined to be magnesium sulfite tri-hydrate (MST).

Despite their attempts at dispersing MST using many known dispersants, the present inventors were repeatedly unsuccessful. Of the many compounds used in their attempts, the only materials which demonstrated MST dispersant activity of any significance were sulfur-containing lignins, the copolymer of a 1-olefin and an unsaturated anhydride, and an oligomer. The use of each of these individual materials alone for dispersing MST in an aqueous medium is the subject of a respective one of three patent applications, filed by applicant. When the individual compounds were combined, it was discovered that their use as an MST dispersant could be optimized from an economic and dispersant afficacy standpoint. In fact, certain combinations of these compounds were discovered to demonstrate particularly enhanced results as MST dispersants.

According to the present invention, a composition useful for dispersing magnesium sulfite tri-hydrate contained in an aqueous medium under precipitating conditions comprises in combination (1) an oligomer (or mixture of oligomers) having the formula

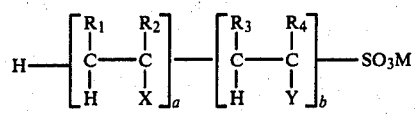

where
M is a water soluble cation of the bisulfite salt, $R_1$, $R_2$, $R_3$ and $R_4$ are hydrogen, methyl or ethyl, Y is one or more hydrophilic groups which, when attached to a vinyl group, form a water soluble homopolymer,
X is one or more hydrophobic groups which, when attached to a vinyl group, form a water insoluble homopolymer and where a+b is broadly between 4 and 250 and a/(a+b) is between zero and 0.6; and
(2) a metal salt (or mixtures thereof) of a copolymer of a 1-olefin with maleic anhydride or other unsaturated anhydride having the formula:

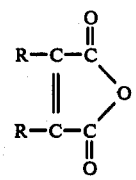

where each R is individually selected from the group consisting of hydrogen, methyl and ethyl.

THE OLIGOMER

The one or more hydrophilic groups represented by Y in the above formula could be represented by —COOH, —COOM, —CONH$_2$, —OCH$_3$, —OC$_2$H$_5$, —CH$_2$OH or

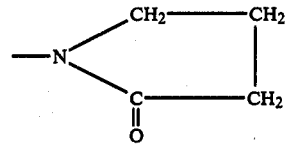

M being a water soluble cation of a bisulfite salt, and the one or more hydrophobic groups represented by X could be represented by —COOC$_2$H$_4$OH, —COOC$_3$H$_6$OH, —CONHCH$_2$OH, —CONHCH$_3$, —CONHC$_2$H$_5$, —CONHC$_3$H$_7$, —CONHC$_8$H$_{17}$, —COOCH$_3$, —COOC$_2$H$_5$, —CN, —OOCCH$_3$, —OOCC$_2$H$_5$, or —CONHC(CH$_3$)$_2$—CH$_2$COCH$_3$.

With respect to the water solubility of the homopolymers discussed above, in the preferred instances, a water soluble homopolymer is one having a water solubility greater than 10%, and a water insoluble homopolymer is one having a water solubility of less than 10%.

It should be understood that the structural units of the oligomer formula presented above are randomly distributed in the molecule, such that the formula represents the average molecule.

The oligomers can be made water soluble by providing for at least one hydrophilic group Y, but there need not be a hydrophobic group X.

The subscript "a" used in the formula represents the total moles of the hydrophobic group or groups per molecule and the subscript "b" the total moles of the hydrophilic group or groups per molecule. The degree of polymerization, a+b, is broadly between 4 and 250, preferably between 10 and 100. The mole fraction of the monomer having the X functional group, a/(a+b), may vary from 0.0–0.6, preferably the mole fraction must be less than 0.4, most desirably, less than 0.3, but the limit on this value will vary with the particular hydrophobic group, and should not be so large that a macrophase of sticky polymer is formed. The ratio of a to b may be varied as desired by the artisan, depending, primarily, on the desired water solubility of the oligomer or its salts.

Examples of monomers having hydrophilic groups are acrylic acid, methacrylic acid, alpha-ethylacrylic acid, beta-methyl acrylic acid, alpha, beta-dimethylacrylic acid, hydroxyethyl acrylate, acrylamide, methacrylamide, vinyl ethyl ether, vinyl methyl ether, vinyl pyrrolidone, and allyl alcohol.

Monomers having hydrophobic groups are acrylonitrile, or methacrylonitrile, ethylacrylonitrile, methyl acrylate, ethyl acrylate, methyl methacrylate, ethyl methacrylate, hydroxyethyl acrylate, hydoxyethyl methacrylate, hydroxypropyl methacrylate, vinyl acetate, vinyl propionate, N-isopropylacrylamide, N-ethyl acrylamide, N-methyl acrylamide, N-isooctyl acrylamide, N-methylolacrylamide and diacetone acrylamide.

The preparation of the oligomer is deemed within the skill of the art, as evidenced by U.S. Pat. No. 3,646,099, which is hereby incorporated by reference.

THE POLYMER

Examples of the unsaturated anhydride include maleic anhydride, monomethylmaleic anhydride, diethylmaleic anhydride and methylethylmaleic anhydride. Mixtures of the materials can also be used.

The olefins should contain 4 to 16, preferably 6 to 10, carbon atoms. Examples include 1-butene; isobutylene; 1-pentene; 2-methyl-1-butene; 3-methyl-1-butene; 1-hexene; 1-heptene; 1-octene; 2,4,4 trimethyl-1-pentene (diisobutylene); 1-nonene; 1-tetradecene; and 1-hexadecene. Mixtures of olefins can also be used.

Examples of the copolymers include those of maleic anhydride/1-butene, dimethylmaleic anhydride/3-methyl-1-butene, ethylmaleic anhydride/1-octene, etc. Of course, mixtures of these polymeric dispersing agents could be used.

The preparation of the copolymers is well known in the art, as is evidenced by U.S. Pat. No. 3,793,277. They can be made, for example, by copolymerizing the anhydride, preferably in solution in an organic diluent such as benzene, with the olefin in the presence of a peroxide catalyst. Elevated temperatures and superatmospheric pressures are usually employed. The monomers copolymerize in substantially equimolar proportions.

The relative amounts of each compound in the composition can vary over a wide range; however, it is preferred that the oligomer be present in an amount not smaller than about 10% by weight of the oligomer-copolymer combination by weight. The preferred upper limit is about 90% of the oligomer in the oligomer-copolymer combination.

The total amount of the composition added to the aqueous medium can vary over a wide range, depending on the nature and severity of the problem. Treatment levels as low as about one part composition, on a total actives basis, per million parts of aqueous medium could be used. The preferred lower limit is about five parts per million. Treatment levels of up to about one thousand parts per million could also be used, with about one hundred parts per million representing the preferred upper limit.

As already noted above, the present inventive composition is particularly useful in a magnesium oxide based gas scrubber system for removing sulfur-containing gases from a gas stream. It is predominantly in these scrubber systems that the peculiar and difficult MST deposit problem exists. The efficiency of these gas scrubber systems in removing $SO_2$ gases increases as the pH of the scrubbing liquid increases; however, the severity of the MST deposition problem also increases with increases in pH, causing severe mechanical disruptions which effectively lower the operating efficiency of the system. Accordingly, the composition is particularly useful at such high pH values of greater than about 7. Since most of the scrubber systems operate at a pH value no greater than 9, the composition is considered to be particularly useful as applied at pH's of up to about 9 in such systems.

EXAMPLES

A series of tests was conducted to determine the comparative activity of many treatment materials with respect to dispersing the trihydrate form of magnesium sulfite in an aqueous medium. The comparisons were based upon a determination of light transmission (T) through an aqueous medium containing MST, using a standard optical cell. The light transmission readings were taken thirty minutes after each treatment was added. Using the T readings, a "Dispersion Efficiency Factor" was calculated using the following formula:

$$Y = 100 - 1.75X$$

where $X = T$ 30 minutes after treatment, and
$Y =$ Dispersion Efficiency Factor.

Accordingly, the higher the Dispersion Efficiency Factor, the more effective was the treatment.

The test procedures used in comparing the various treatments were as follows. To a weighing bottle was added 0.45 gram of magnesium sulfite tri-hydrate which had been ground to 120 mesh. Next, the treatment was added to the desired level and the net weight was adjusted to 15 grams with distilled water at 50° C. making a 3% slurry of MST. The resultant mixture was transferred to a 0.5 cm optical cell and agitated, and the transmittance (T) was recorded as a function of time.

EXAMPLE 1

The treatment materials tested are listed below in Table 1.

TABLE 1

| Product No. | Chemical Description |
|---|---|
| 1 | Sodium polyacrylamide (molecular weight = 6,000–10,000) |
| 2 | Polyacrylamide |
| 3 | Polyacrylate (molecular weight ≃ 90,000) |
| 4 | Polyacrylate (molecular weight ≃ 7,000–10,000) |
| 5 | Polyacrylate different from Products 3 and 4 |
| 6 | Sodium salt of condensed naphthalene sulfonic acid |
| 7 | Oligomeric compound of present invention |
| 8 | Copolymer of 1-olefin and unsaturated anhydride |
| 9 | Sodium tripolyphosphate |
| 10 | Tetrapotassium pyrophosphate |
| 11 | Complex phosphate |
| 12 | Ethylenediaminetetraacetic acid |

TABLE 1-continued

| Product No. | Chemical Description |
|---|---|
| 13 | Chelant |
| 14 | Phosphonate |
| 15 | Polycarboxylic acid |

The oligomer tested, Product No. 7, is sold under the tradename Polywet ND-1 by Uniroyal, Inc. It was determined by analysis that this product does fall within the general formula noted above. More specifically, the product was determined to have the following formula:

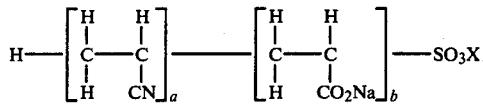

where X was determined to be a water soluble cation of the bisulfite salt and where a/a+b was determined to be 0.28 .

The polymeric compound of the present invention which was tested was a sodium salt of a copolymer of diisobutylene and maleic anhydride which is sold under the tradename Tamol 731 by Rohm and Haas Company.

In addition to the oligomeric and polymeric compounds which are the subjects of the present invention, a third group of compounds was discovered to have MST dispersant activity. These compounds in combination with the oligomer of the present invention are the subject of a separate application filed by the present applicant and can be broadly described as sulfur-containing lignins.

EXAMPLE 2

The results of the tests described above are reported below in Table 2. The results are reported at 30 ppm since that was determined to be a particularly suitable treatment level for comparison of the dispersant activities of the compounds. A negative value indicates that the treatment acted as a flocculant.

TABLE 2

| Product No. | Dispersion Efficiency Factor |
|---|---|
| 1 | −33 |
| 2 | −40 |
| 3 | −59 |
| 4 | −19 |
| 5 | −22.5 |
| 6 | 4 |
| 7 | 79 |
| 8 | 56.5 |
| 9 | 6.5 |
| 10 | −3 |
| 11 | −28 |
| 12 | 0 |
| 13 | 0 |
| 14 | 0 |
| 15 | −11 |

As can be seen from Table 2, the oligomer (Product 7) and the 1-olefin/unsaturated anhydride copolymer (Product 8) far outperformed the remaining materials in dispersing MST. In this respect it is noted that Products 6, 8 and 15 are all sold under the Tamol tradename: Product 6 as Tamol SN and Product 15 as Tamol 850; and these products are all well-known dispersants. However, as is clear from Table 2, Product 8 was the only one of the Tamol group to demonstrate significant MST dispersant activity.

EXAMPLE 3

The oligomeric compound (Product 7) and the 1-olefin/unsaturated anhydride copolymer (Product 8) were also tested at 10 ppm actives and 50 ppm actives (based on total volume) and the results are reported below in Tables 3 and 4.

TABLE 3

| Oligomeric Compound | | |
|---|---|---|
| Treatment level (ppm) | 10 | 50 |
| Dispersion Efficiency Factor | 57 | 85 |

TABLE 4

| Copolymer of 1-olefin and unsaturated anhydride | | |
|---|---|---|
| Treatment level (ppm) | 10 | 50 |
| Dispersion Efficiency Factor | 29.5 | 68.5 |

From Tables 3 and 4 it can be seen that the products reported are active as MST dispersants over a wide dosage range.

EXAMPLE 4

Having discovered significant MST dispersant activity for the oligomerand copolymer alone, the present inventors tested various blends of the compounds to determine if the optimization of an MST dispersant could be accommodated on an activity/economic basis. The compounds were simply added in combination to the test system as outlined in the above-described test procedures. The results are reported in the graph in the FIGURE as a plot of treatment level in parts per million on an actives basis against Dispersion Efficiency Factor. As can be seen from the reported results, the various blends of the oligomer and the copolymer do demonstrate significant MST dispersant activity. In fact, the 4/1 ratio of the oligomer to the copolymer was determined to be particularly effective in the pH range of 7 to 9 which range, as noted above, presents the most severe MST deposit problem.

Having thus described our invention, We claim:

1. A composition comprising in combination:

(i) oligomer having the formula 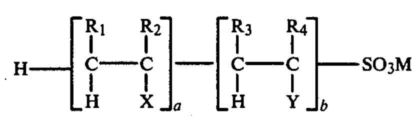 where $R_1$, $R_2$, $R_3$ and $R_4$ are the same or different and are selected from the group consisting of hydrogen, methyl and ethyl; Y is at least one member selected from the group consisting of —COOH, —COOM, —$CONH_2$, —$OCH_3$, —$OC_2H_5$, —$CH_2OH$, and

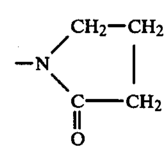

;

X is one or more members selected from the group consisting of —COOC$_2$H$_4$OH, —COOC$_3$H$_6$OH, —CONHCH$_2$OH, —CONHCH$_3$, —CONHC$_2$H$_5$, —CONHC$_3$H$_7$, —CONHC$_8$H$_{17}$, —COOCH$_3$, —COOC$_2$H$_5$, —CN, —OOCCH$_3$, —OOCC$_2$H$_5$, and —CONHC(CH$_3$)$_2$—CH$_2$COCH$_3$; a+b is 4 to 250; a/(a+b) is between 0.0 and 0.6; and M is a water soluble cation of a bisulfite salt;

(ii) an effective metal salt of a copolymer of 1-olefin having from 4 to 16 carbon atoms and a compound having the formula:

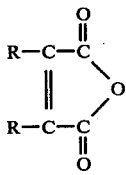

where R is individually selected from the group consisting of hydrogen, methyl and ethyl; and (iii) aqueous medium containing magnesium sulfite trihydrate under precipitating conditions.

2. The composition of claim 1, wherein a+b is 10 to 100; Y is selected from the group consisting of —COOM, —COOH, —CONH$_2$, —OCH$_3$, —OC$_2$H$_5$, and —CH$_2$OH; and wherein X is the group —CN.

3. The composition of claim 2, wherein Y is —COOM.

4. The composition of claim 3, wherein Y is —COONa.

5. The composition of claim 2, wherein the 1-olefin is diisobutylene and R is hydrogen.

6. The composition of claim 3, wherein the 1-olefin is diisobutylene and R is hydrogen.

7. The composition of claim 4, wherein the 1-olefin is diisobutylene and R is hydrogen.

8. The composition of claim 1, wherein the oligomer is present in the combination in an amount of from about 10% to about 90% by weight.

9. The composition of claim 8, wherein a+b is 10 to 100; Y is selected from the group consisting of —COOM, —COOH, —CONH$_2$, —OCH$_3$, —OC$_2$H$_5$, and —CH$_2$OH; and wherein X is the group —CN.

10. The composition of claim 9, wherein Y is —COOM.

11. The composition of claim 10, wherein Y is —COONa.

12. The composition of claim 9, wherein the 1-olefin is diisobutylene and R is hydrogen.

13. The composition of claim 10, wherein the 1-olefin is diisobutylene and R is hydrogen.

14. The composition of claim 11, wherein the 1-olefin is diisobutylene and R is hydrogen.

* * * * *